(12) United States Patent
Kawasaki et al.

(10) Patent No.: US 6,482,498 B1
(45) Date of Patent: Nov. 19, 2002

(54) HONEYCOMB STRUCTURAL BODY

(75) Inventors: Shinji Kawasaki, Nagoya; Kiyoshi Okumura; Shigenori Ito, both of Kasugai, all of (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/502,792

(22) Filed: Feb. 11, 2000

(30) Foreign Application Priority Data

Feb. 18, 1999 (JP) .......................................... 11-039501

(51) Int. Cl.$^7$ ................................................. B32B 3/12
(52) U.S. Cl. ........................ 428/116; 428/188; 422/177; 422/180
(58) Field of Search ............................... 428/116, 188; 422/177, 180

(56) References Cited

U.S. PATENT DOCUMENTS 3,227,601 A * 1/1966 Crosby
5,277,958 A * 1/1994 Tomkins
6,162,524 A * 12/2000 Patchett et al.

* cited by examiner

Primary Examiner—Deborah Jones
Assistant Examiner—Wendy Boss
(74) Attorney, Agent, or Firm—Parkhurst & Wendel, L.L.P.

(57) ABSTRACT

A honeycomb structural body is formed by a plurality of first wall portions, a plurality of second wall portions and a plurality of cross portions. Moreover, through holes of the honeycomb structural body are respectively defined by the first wall portion, the second wall portion and the cross portion. Further, a center portion of the first wall portion is formed by a sub material other than a main material which constitutes the honeycomb structural body. The honeycomb structural body having the structure mentioned above has excellent mechanical strength and spalling resistance.

5 Claims, 3 Drawing Sheets

HONEYCOMB STRUCTURAL BODY

BACKGROUND OF THE INVENTION

1. Field of the Invention

The present invention relates to a honeycomb structural body and particularly relates to a honeycomb structural body used preferably for a structural body such as a catalyst carrier, an electrochemical cell and so on.

2. Description of Related Art

A honeycomb structural body having a plurality of through holes is used in the fields of automobile, fuel cell and so on. For example, as a catalyst carrier used for purifying an exhaust gas of the automobile, a honeycomb structural body made of cordierite is preferably used from view points of heat resistance, heat shock resistance and purifying efficiency. Moreover, in a field of the fuel cell, a stick-type honeycomb structural body, in which two kinds of materials i.e. YSZ (yttria stabilized zirconia) and lanthanum chromite are alternately stacked, is invented as a base member for the electrochemical cell from a view point of a high output density.

In any event, during the manufacturing steps of the honeycomb structural bodies used for these purposes mentioned above, a simultaneous extrusion forming method, having the steps of inserting respective materials which construct the honeycomb structural body into respective cylinders and extruding the materials simultaneously to obtain a formed body, is included.

However, when the honeycomb structural body is to be manufactured by means of the extrusion forming method as mentioned above, there are following drawbacks. In the case of the honeycomb structural body made of cordierite used for the catalyst carrier for purifying an exhaust gas of the automobile, a strength at near a center portion of respective walls, which construct through holes, becomes extremely low. In addition, defects are liable to be generated during an extrusion from a die. Therefore, there is a drawback such that a mechanical strength and a spalling resistance of the honeycomb structural body obtained in this manner are deteriorated.

Moreover, in the case of the honeycomb structural body for an electrochemical cell made of the two kinds of materials i.e. YSZ and lanthanum chromite, the thus stacked YSZ and lanthanum chromite are reacted each other. Therefore, there is a drawback such that a mechanical strength is deteriorated since a structure is finely varied.

SUMMARY OF THE INVENTION

An object of the invention is to provide a new honeycomb structural body having excellent mechanical strength and spalling resistance.

According to the invention, a honeycomb structural body having a plurality of wall portions and a plurality of cross portions, wherein a plurality of through holes are formed by the wall portions and the cross portions, comprises a structure such that: (1) the cross portions are made of a main material which constitutes the honeycomb structural body; (2) the wall portions have a first wall portion; and (3) a center portion of the first wall portion is made of a sub material which is different from the main material.

FIG. 1 is a cross sectional view showing one embodiment of a honeycomb structural body according to the invention. Moreover, FIG. 2 is a perspective view illustrating an appearance of the honeycomb structural body according to the invention.

In the figures explained below, a portion made of a main material of the honeycomb structural body is shown by a hatched area, and a portion made of a sub material of the honeycomb structural body is shown by a black area. In addition, for making an explanation clearly, dimension ratios and details of respective portions are described differently from the actual honeycomb structural body.

A honeycomb structural body 1 shown in FIG. 1 comprises a plurality of wall portions constructed by first wall portions 2 and second wall portions 3 and a plurality of cross portions 5. Further, the honeycomb structural body 1 comprises a plurality of through holes 4 defined by the first wall portions 2, the second wall portions 3 and the cross portions 5.

The cross portions 5 are formed by the main material constituting the honeycomb structural body 1. Moreover, center portions 2a of the first wall portions 2 are formed by the sub material other than the main material mentioned above, and end portions 2b of the first wall portions 2 are formed by the main material. Further, the entire second wall portion 3 is formed by the main material, and the second wall portions 3 and the cross portions 5 are continued in Q direction of the honeycomb structural body 1.

In this invention, a term "cross portion" means a portion formed by intersecting the plurality of wall portions with each other. For example, the cross portions 5 shown in FIG. 1 means a portion formed by intersecting the first wall portion 2 and the second wall portion 3 defining the through hole 4.

Moreover, in this invention, a term "main material" means a material which constructs mainly the cross portion and a greater part of the honeycomb structural body, and specifically a material which is included in the honeycomb structural body by 50–99 wt %. Further, in this invention, a term "sub material" means a different material from the main material, which constructs mainly the center portion of the first wall portion, and specifically a material which is included in the honeycomb structural body by 50–1 wt %.

Therefore, in the case that the honeycomb structural body shown in FIG. 1 is used as the catalyst carrier for purifying the exhaust gas of the automobile, if the center portion 2a of the first wall portion 2 is formed by the sub material such as zirconia, alumina and so on having a larger mechanical strength than that of cordierite used as the main material which constructs the honeycomb structural body 1, it is possible to prevent a strength decrease at the center portion of the wall which is a problem of the known honeycomb structural body. In addition, according to the invention, since it is possible to suppress a defect generation during the extrusion forming from the die, it is possible to easily improve a mechanical strength and a spalling resistance of the honeycomb structural body.

Moreover, the main material is formed by two kinds of materials i.e. YSZ and lanthanum chromite, and two kinds of materials are stacked in such a manner that respective row portions P1 of the through hole 4 shown in FIG. 1 is assumed as one cycle. In this case, the center portion 2a of the first wall portion 2 corresponding to a connection portion between YSZ and lanthanum chromite is formed by the sub material such as lanthanum zirconate and so on which is hardly reacted with YSZ and lanthanum chromite, so that it is possible to prevent a fine variation of the honeycomb structural body.

Further, as shown in FIG. 1, the sub material is used only at the center portion 2a of the first wall portion 2 which is a part of the honeycomb structural body. Therefore, it is possible to improve the defects which are existent in the known honeycomb structural body without affecting properties of the known catalyst carrier for the automobile or the known electrochemical cell.

DESCRIPTION OF THE PREFERRED EMBODIMENT

Hereinafter, the present invention will be explained in detail with reference to the drawings.

Figure 3:
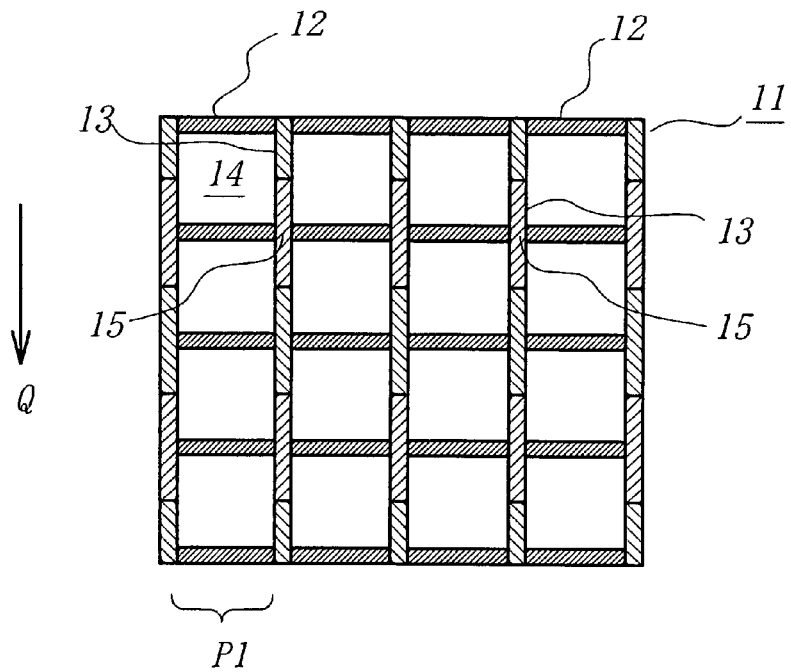
FIG. 3 is a cross sectional view depicting another embodiment of the honeycomb structural body according to the invention.

FIG. 3 is a cross sectional view showing another embodiment of the honeycomb structural body according to the invention. In the honeycomb structural body shown in FIG. 1, the center portion 2a of the first wall portion 2 is formed by the sub material only, and the end portion 2b of the first wall portion 2 is formed by the main material. On the other hand, as shown in FIG. 3 by a honeycomb structural body 11, an entire first wall portion 12 may be formed by the sub material only. In this case, for example in the case that the honeycomb structural body according to the invention is used as the catalyst carrier for purifying the exhaust gas in the automobile, if use is made of the sub material having a larger mechanical strength than that of cordierite, it is possible to further improve a mechanical strength of the overall honeycomb structural body.

Figure 1:
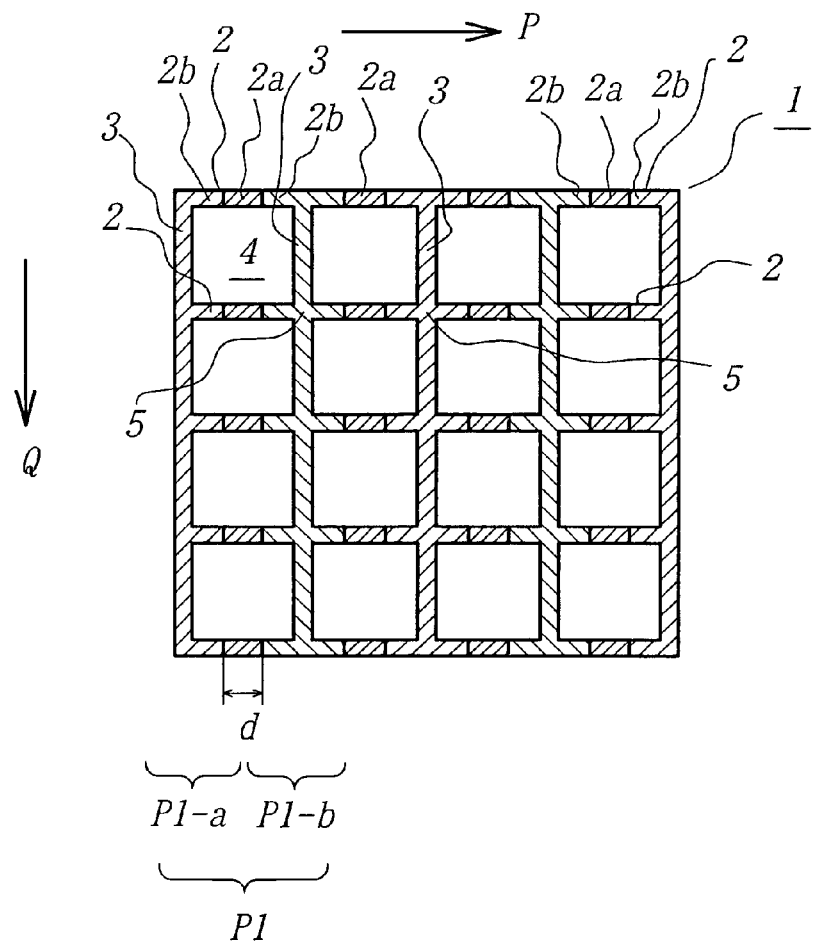
FIG. 1 is a cross sectional view showing one embodiment of a honeycomb structural body according to the invention.

Moreover, a plurality of wall portions, which construct the honeycomb structural bodies 1 and 11 shown in FIGS. 1 and 3, comprise the second wall portions 3 and 13 made of the main material only. The second wall portions 3 and 13 are continued respectively in Q direction of the cross portions 5, 15 and the honeycomb structural bodies 1 and 11. Therefore, a strength anisotropy in Q direction is generated in the honeycomb structural bodies 1 and 11, and thus it is possible to obtain an advantage such that a thermal expansion action in Q direction can be treated in the same manner as that of the honeycomb structural body made of the main material only.

Figure 4:
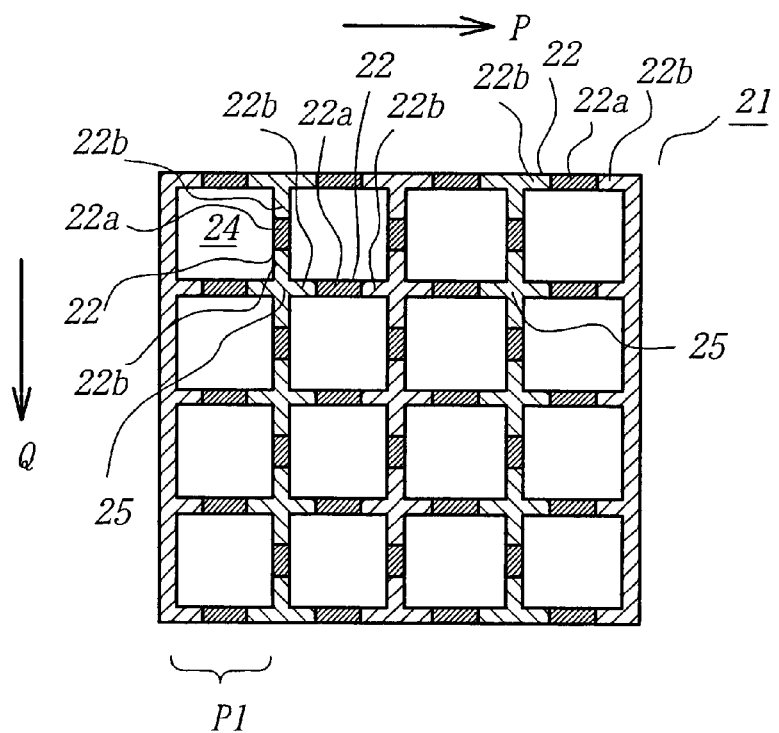
FIG. 4 is a cross sectional view showing still another embodiment of the honeycomb structural body according to the invention.

FIG. 4 is a cross sectional view showing still another embodiment of the honeycomb structural body according to the invention. In a honeycomb structural body 21 shown in FIG. 4, end portions 22b of a first wall portion 22 are formed by the main material as is the same as the end portions 2b of the first wall portion 2 in the honeycomb structural body 1 shown in FIG. 1. In the honeycomb structural bodies 1 and 11 shown in FIGS. 1 and 3, the cross portions 5 and 15 are adjacent to the first wall portions 2, 12 and the second wall portions 3, 13. On the other hand, in the honeycomb structural body 21 shown in FIG. 4, all the wall portions adjacent to a cross portion 25 are constructed by the first wall portions 22. Therefore, a strength isotropy of the honeycomb structural body 21 is increased, and thus a mechanical strength thereof is further improved.

Figure 5:
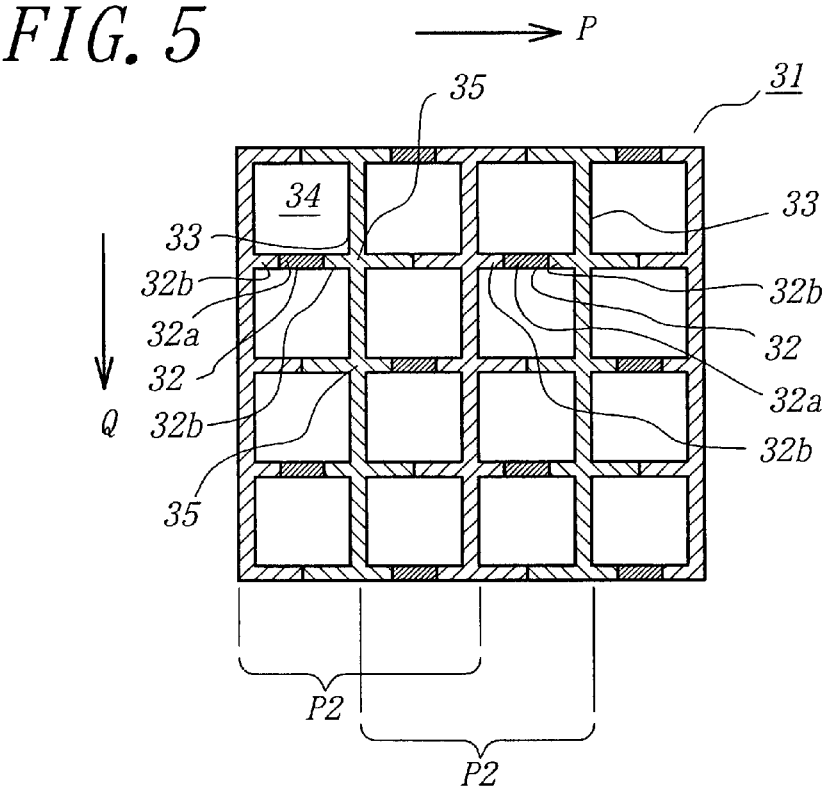
FIG. 5 is a cross sectional view illustrating still another embodiment of the honeycomb structural body according to the invention.

FIG. 5 is a cross sectional view showing still another embodiment of the honeycomb structural body according to the invention. In the honeycomb structural bodies shown in FIGS. 1, 3 and 4, all the wall portions in P direction or in Q direction are constructed by the first wall portions. However, according to a use application, the wall portions of the honeycomb structural body in P direction may be constructed alternately by a first wall portion 35.

Figure 6:
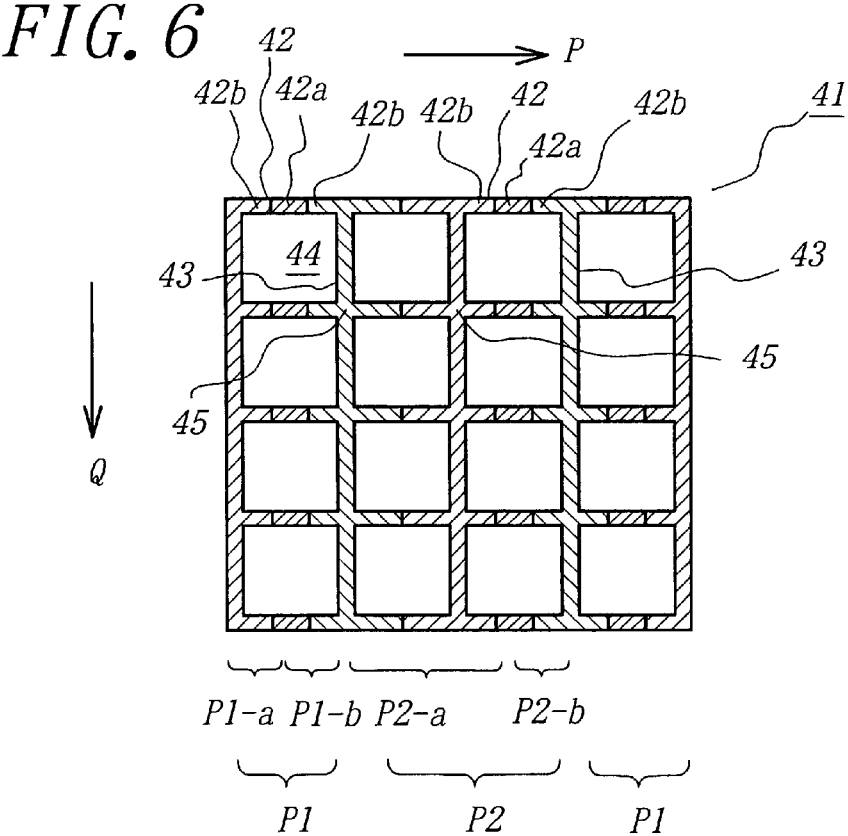
FIG. 6 is a cross sectional view depicting still another embodiment of the honeycomb structural body according to the invention.

FIG. 6 is a cross sectional view showing still another embodiment of the honeycomb structural body according to the invention. In the honeycomb structural bodies 1, 11 and 21 shown in FIGS. 1, 3 and 4, the main material and the sub material are stacked in such a manner that respective row portions P1 of the through holes is assumed as one cycle. On the other hand, in the honeycomb structural body 31 shown in FIG. 5, they are stacked in such a manner that respective row portions P2 having a length twice as large as P1 is assumed as one cycle. Moreover, in a honeycomb structural body 41 shown in FIG. 6, the main material and the sub material are stacked in such a manner that the cycles P1 and P2 are mixed. However, since a density of the sub material per a unit volume can be improved by stacking the main material and the sub material on the basis of the respective row portions P1 as one cycle, it is possible to further improve a mechanical strength and a spalling resistance which are an object of the invention.

The main material and the sub material, which construct the honeycomb structural body according to the invention, are not necessarily formed by a single material, but use may be made of a mix material in which a plurality of materials are mixed according to the use application.

Further, for example in the honeycomb structural body 1 shown in FIG. 1, the stack cycle P1 is divided into portions P1-a and P1-b at both ends of the center portion 2a of the first wall portion 2. Then, the portion P1-a is formed by a first main material, and the portion P1-b is formed by a second main material other than the first main material. In this case, it is possible to form the honeycomb structural body in which the first main material, the sub material and the second main material are cyclically stacked in this order.

For one example, YSZ is used as the first main material, lanthanum chromite is used as the second main material and lanthanum zirconate is used as the sub material. As a result, it is possible to obtain the honeycomb structural body for the electrochemical cell in which YSZ, lanthanum zirconate and lanthanum chromite are cyclically stacked in this order.

Moreover, in the honeycomb structural body 41 shown in FIG. 6, the stack cycle P1 is divided into the portions P1-a and P1-b as mentioned above, and the stack cycle P2 is divided into portions P2-a and P2-b at both ends of a center portion 42a of a first wall portion 42. Then, the portions P1-a and P2-b are formed by the first main material, and the portions P1-b and P2-a are formed by the second main material other than the first main material. In this case, it is possible to obtain the honeycomb structural body in which the first main material the sub material/the second main material/ the sub material are stacked as one cycle.

For example, use is made of a porous alumina ① having an average particle size of 1 μm as the first main material, a porous alumina ② having an average particle size of 10 μm as the second main material and a dense alumina ③ as the sub material. As a result, it is possible to obtain the honeycomb structural body for a filter in which the porous alumina ①/the dense alumina ③/the porous alumina ②/the dense alumina ③ are stacked as one cycle.

A method of producing the honeycomb structural body is not limited particularly, but a following producing method is generally used. At first, raw material powders of the main material and the sub material are prepared and mixed to form a predetermined main material batch and sub material batch. Then, the main material batch and the sub material batch are filled in a plurality of cylinders, and then a honeycomb structural body is produced by means of a simultaneous extrusion forming method. Then, the thus produced honeycomb structural body is dried and then set in an electric furnace to perform a sintering by heat. After that, the honeycomb structural body can be obtained.

Therefore, in the case of producing the honeycomb structural body by using the simultaneous extrusion forming method, the center portion of the first wall portion made of the sub material corresponds to the connection portion made of the main material.

Hereinafter, the present invention will be explained with reference to actual examples.

EXAMPLE 1

In this example 1, the honeycomb structural body having a structure shown in FIG. 1 was produced. The respective raw portions P1 of the through hole was divided into the portions P1-a and P1-b. Then, the portion P1-a was formed by the first main material. The portion P1-b was formed by the second main material other than the first main material. As a result, the honeycomb structural body, in which the first main material/the sub material/the second main material were stacked as one cycle, was produced.

(Producing of Batch)

<First Main Material Batch>

3 parts by weight of methylcellulose and 3 parts by weight of polyvinyl alcohol were mixed with respect to 100 parts by weight of lanthanum chromite powders having an average particle size of 3 $\mu$m to obtain a mixture. Then, 14 parts by weight of water was added in the mixture and then the mixture with water was kneaded for 3 hours by means of a pressurized kneading apparatus to obtain a kneaded member. Then, the kneaded member was set in a vacuum pug mil to produce a cylindrical first main material batch having a diameter of 80 mm and a length of 300 mm.

<Second Main Material Batch>

5 parts by weight of methylcellulose and 4 parts by weight of polyvinyl alcohol were mixed with respect to 100 parts by weight of 8 mol % yttria stabilized zirconia powders having an average particle size of 1.5 $\mu$m to obtain a mixture. Then, 18 parts by weight of water was added in the mixture and then the mixture with water was kneaded for 3 hours by means of a pressurized kneading apparatus to obtain a kneaded member. Then, the kneaded member was set in a vacuum pug mil to produce a cylindrical second main material batch having a diameter of 80 mm and a length of 300 mm.

<Sub Material Batch>

4 parts by weight of methylcellulose and 4 parts by weight of polyvinyl alcohol were mixed with respect to 100 parts by weight of lanthanum zirconate powders having an average particle size of 2 $\mu$m to obtain a mixture. Then, 14 parts by weight of water was added in the mixture and then the mixture with water was kneaded for 3 hours by means of a pressurized kneading apparatus to obtain a kneaded member. Then, the kneaded member was set in a vacuum pug mill to produce a cylindrical sub material batch having a diameter of 80 mm and a length of 300 mm.

The thus obtained batches were respectively filled in respective cylinder of a triaxial extrusion forming apparatus. Then, the batches were extruded under a condition such that extrusion speeds from respective batches were substantially constant by controlling an oil pressure of a plunger to obtain a honeycomb structural formed body.

(Producing of Honeycomb Structural Body by Sintering)

The thus obtained honeycomb structural formed body was set in a dryer to perform a drying operation at 80° C. for 10 hours under a condition such that a moisture was suitably controlled. Then, the honeycomb structural formed body was set in an electric furnace. An atmosphere in the electric furnace was heated up to 1600° C. by an ascending rate of 100° C./hours and then maintained at 1600° C. for 3 hours so as to perform a sintering operation of the honeycomb structural formed body. After that, an atmosphere in the electric furnace was cooled by a descending rate of 200° C./hours. When a temperature in the electric furnace became at 100° C., a sintered body was picked up and the honeycomb structural body can be obtained.

Outer dimensions of the sintered body were a length of 60 mm and a breadth of 60 mm, and a length L2 of the sintered body was 300 mm. Moreover, the respective row portions P1 of the through hole were 2 mm, and a width (d) of the center portion 2a made of the sub material was 500 $\mu$m. Further, a thickness of the first wall portion 2 and a thickness of the second wall portion 3 were 200 $\mu$m respectively.

(Spalling Test)

Figure 2:
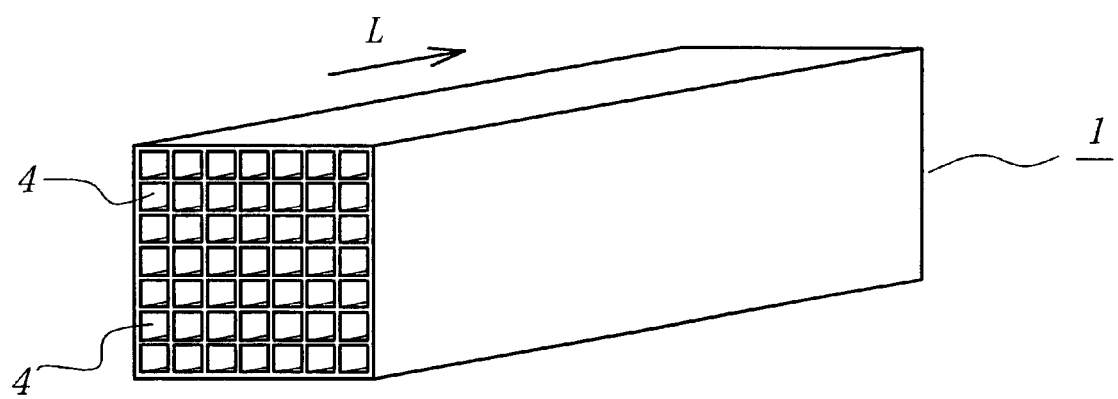
FIG. 2 is a perspective view illustrating an appearance of the honeycomb structural body according to the invention.

Sample A was obtained by cutting the thus obtained honeycomb structural body along L direction shown in FIG. 2 in such a manner that the number of the through holes 4 extended along L direction were 5 in a lengthwise direction and 10 in a breadthwise direction and a length was 100 mm. Moreover, sample B was obtained by cutting the thus obtained honeycomb structural body along a perpendicular direction with respect to L direction shown in FIG. 2 in such a manner that the number of the through holes 4 extended along L direction were 20 in a lengthwise direction and 4 in a breadthwise direction and a length was 4 mm. Then, a spalling test was performed by applying 10 heat cycle loads to the thus obtained samples A and B. In this case, one heat cycle load was assumed to be following steps of heating up to 1000° C. by an ascending rate of 300° C./minute, keeping at 1000° C. for 10 minutes and cooling up to 200° C. by a descending rate of 300° C./minute. Moreover, 4-point bending test was performed with respect to the sample A and the sample B before and after applying the heat cycle load. Then, a spalling resistance was estimated from a decreasing rate of a fracture strength after the heat cycle load. The results are shown in Table 1.

EXAMPLE 2

Also in this example 2, the honeycomb structural body having a structure shown in FIG. 1 was produced. In this example 2, the center portion 2a of the first wall portion 2 was formed by the sub material, and the end portion 2b of the first wall portion 2, the second wall portion 3 and the cross portion 5 were formed by the main material. As a result, the honeycomb structural body, in which the main material/the sub material/the main material were stacked as one cycle, was produced.

(Producing of Batch)

<Main Material Batch>

10 parts by weight of cellulose, 3 parts by weight of methylcellulose and 3 parts by weight of polyvinyl alcohol were mixed with respect to 100 parts by weight of porous alumina powders having an average particle size of 3 μm to obtain a mixture. Then, 18 parts by weight of water was added in the mixture and then the mixture with water was kneaded for 4 hours by means of a pressurized kneading apparatus to obtain a kneaded member. Then, the kneaded member was set in a vacuum pug mil to produce a cylindrical first main material batch having a diameter of 80 mm and a length of 300 mm.

<Sub Material Batch>

5 parts by weight of methylcellulose and 4 parts by weight of polyvinyl alcohol were mixed with respect to 100 parts by weight of dense alumina powders having an average particle size of 1 μm to obtain a mixture. Then, 15 parts by weight of water was added in the mixture and then the mixture with water was kneaded for 4 hours by means of a pressurized kneading apparatus to obtain a kneaded member. Then, the kneaded member was set in a vacuum pug mill to produce a cylindrical sub material batch having a diameter of 80 mm and a length of 300 mm.

(Producing of Formed Body)

The thus obtained batches were respectively filled in respective cylinder of a biaxial extrusion forming apparatus. Then, the batches were extruded under a condition such that extrusion speeds from respective batches were substantially constant by controlling an oil pressure of a plunger to obtain a honeycomb structural formed body.

(Producing of Honeycomb Structural Body by Sintering)

The thus obtained honeycomb structural formed body was sintered in the same manner as that of the example 1 to obtain the honeycomb structural body. Outer dimensions of the sintered body were a length of 60 mm and a breadth of 60 mm, and a length L2 of the sintered body was 300 mm. Moreover, the respective row portions P1 of the through hole were 2.5 mm, and a width (d) of the center portion 2a made of the sub material was 0.5 mm. Further, a thickness of the first wall portion 2 and a thickness of the second wall portion 3 were 200 μm respectively.

(Spalling Test)

Samples A and B were cut from the thus obtained honeycomb structural body in the same manner as that of the example 1. The spalling test was performed with respect to the samples A and B in the same manner as that of the example 1. The spalling resistance was estimated by the 4-point bending test before and after the heat cycle load.

Comparative Example 1

The honeycomb structural body was produced in the same manner as that of the example 1 except that the sub material was not used, so that the honeycomb structural body, having the same structural as that of the example 1 except that the center portion of the first wall portion was not formed by the sub material, was obtained.

Samples A and B were cut from the thus obtained honeycomb structural body in the same manner as that of the example 1. The 4-point bending tests for the samples A and B were performed before and after the heat cycle load as is the same as the example 1, and the spalling resistance was estimated from a decreasing rate of a fracture strength before and after the heat cycle load. The results are shown in Table 1.

Comparative Example 2

The honeycomb structural body was produced in the same manner as that of the example 2 except that the sub material was not used, so that the honeycomb structural body, having the same structural as that of the example 2 except that the center portion of the first wall portion was not formed by the sub material, was obtained.

Samples A and B were cut from the thus obtained honeycomb structural body in the same manner as that of the example 2. The 4-point bending tests for the samples A and B were performed before and after the heat cycle load as is the same as the example 2, and the spalling resistance was estimated from a decreasing rate of a fracture strength before and after the heat cycle load. The results are shown in Table 1.

TABLE 1

|  | Fracture strength before heat cycle load (MPa) | | Fracture strength after heat cycle load (MPa) | |
| --- | --- | --- | --- | --- |
|  | Sample A | Sample B | Sample A | Sample B |
| Example 1 | 5.3 | 2.8 | 5.2 | 2.6 |
| Example 2 | 3.1 | 1.5 | 3.3 | 1.4 |
| Comparative Example 1 | 3.2 | 1.8 | 1.0 | 0.7 |
| Comparative Example 2 | 2.0 | 1.2 | 1.5 | 0.7 |

From the results shown in Table 1, it is understood that, the honeycomb structural body according to the invention shown by the examples 1 and 2, in which the center portion of the first wall portion was formed by the sub material such as yttria stabilized zirconia which improves the spalling resistance, does not decrease a fracture strength before and after the heat cycle load and has a high spalling resistance.

Contrary to this, it is understood that, the honeycomb structural body show by the comparative examples 1 and 2, in which the center portion of the first wall portion is not formed by the sub material, decreases a fracture strength before and after the heat cycle load and has a low spalling resistance.

In the explanations mentioned above, the present invention is explained in detail with reference to the actual examples, but the present invention is not limited to the embodiments mentioned above, and various modifications are possible within the scope of the invention.

As mentioned above, according to the honeycomb structural body of the invention, if the honeycomb structural body is used for the catalyst carrier for purifying the exhaust gas of the automobile or for the electro-chemical cell, it is possible to improve the properties such as the mechanical strength and the spalling resistance, which are the problems of the known honeycomb structural body, without affecting the other properties.

What is claimed is:

1. A honeycomb structural body having a plurality of wall portions and a plurality of cross portions where wall portions intersect, wherein a plurality of through channels are formed by the wall portions and the cross portions, comprising a structure wherein:

(1) the cross portions comprise a main material;
   (2) at least some of the wall portions comprise a center portion which comprises a sub material which is different from the main material; and
   (3) end portions of the wall portions having a center portion, comprise the main material.

2. The honeycomb structural body according to claim 1, wherein the honeycomb structural body comprises a stack of the main material and the sub material.

3. The honeycomb structural body according to claim 2, wherein one stack cycle of the main material and the sub material form one or more rows or lines of the through channels extending through the length of the body.

4. The honeycomb structural body according to claim 1 wherein said body comprises ceramic material.

5. The honeycomb structural body according to claim 4 wherein said main material comprises at least one material selected from the group consisting of: yttria stabilized zirconia, lanthanum chromite, and alumina.

* * * * *